United States Patent
Naono

(10) Patent No.: US 12,436,380 B2
(45) Date of Patent: Oct. 7, 2025

(54) OPTICAL SCANNING DEVICE AND CONTROL METHOD THEREOF

(71) Applicant: FUJIFILM Corporation, Tokyo (JP)

(72) Inventor: Takayuki Naono, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 428 days.

(21) Appl. No.: 18/068,765

(22) Filed: Dec. 20, 2022

(65) Prior Publication Data

US 2023/0221546 A1 Jul. 13, 2023

(30) Foreign Application Priority Data

Jan. 11, 2022 (JP) .................................. 2022-002608

(51) Int. Cl.
*G02B 26/08* (2006.01)
*G02B 26/10* (2006.01)

(52) U.S. Cl.
CPC ....... *G02B 26/101* (2013.01); *G02B 26/0858* (2013.01)

(58) Field of Classification Search
CPC .......................... G02B 26/101; G02B 26/0858; G02B 26/105; G02B 26/08; G01S 7/4817
See application file for complete search history.

(56) References Cited

U.S. PATENT DOCUMENTS

| 6,147,822 A | 11/2000 | Yamada et al. |
| 2009/0323149 A1 | 12/2009 | Mizukami et al. |

(Continued)

FOREIGN PATENT DOCUMENTS

| CN | 113031003 A | 6/2021 |
| EP | 4 109 185 A1 | 12/2022 |

(Continued)

OTHER PUBLICATIONS

Extended European Search Report dated Jun. 5, 2023 for Application No. 22214091.5.

(Continued)

*Primary Examiner* — Euncha P Cherry
(74) *Attorney, Agent, or Firm* — Birch, Stewart, Kolasch & Birch, LLP

(57) ABSTRACT

An optical scanning device causes a mirror portion to perform a spiral rotation operation with a first driving signal applied to a first actuator and a second driving signal applied to a second actuator as cyclic voltage signals. In a case where a resonance frequency and a resonance Q value of a resonance mode, among resonance modes accompanied by mirror tilt swing around a first axis, closest to a frequency of the cyclic voltage signal are respectively set as $f_{r1}$ and $Q_1$, a resonance frequency and a resonance Q value of a resonance mode, among resonance modes accompanied by mirror tilt swing around a second axis, closest to the frequency of the cyclic voltage signal are respectively set as $f_{r2}$ and $Q_2$, and the frequency of the cyclic voltage signal is $f_d$, a relationship of $Q_1 \neq Q_2$, $F_{r2} < f_{r1}$, and $f_{r2} \times (1-1/(1.2 \times Q_2)) \leq f_d \leq f_{r1} \times (1+1/(6 \times Q_1))$ is satisfied.

5 Claims, 13 Drawing Sheets

(56) References Cited

U.S. PATENT DOCUMENTS

2012/0327494 A1* 12/2012 Koyama ............ G02B 26/101
                                                              359/200.8
2019/0004233 A1    1/2019 Shimamoto et al.
2019/0068934 A1    2/2019 Giusti et al.

FOREIGN PATENT DOCUMENTS

| EP | 4 184 234 A1 | 5/2023 |
| JP | 11-30763 A | 2/1999 |
| JP | 2008-170500 A | 7/2008 |
| JP | 2009-80154 A | 4/2009 |
| JP | 2011-53137 A | 3/2011 |
| JP | 2017-167254 A | 9/2017 |
| JP | 2020-160141 A | 10/2020 |
| WO | WO 2017/163361 A1 | 9/2017 |

OTHER PUBLICATIONS

Senger et al., "A 2D circular-scanning piezoelectric MEMS mirror for laser material processing", Proc. of SPIE, vol. 11697, 2021, pp. 1169704-1-1169704-9.

Japanese Office Action for corresponding Japanese Application No. 2022-002608, dated Jul. 8, 2025, with English translation.

* cited by examiner

| | | | EXAMPLE 1 | | EXAMPLE 2 | |
|---|---|---|---|---|---|---|
| | | | EXPANSION PERIOD TE | CONTRACTION PERIOD TS | EXPANSION PERIOD TE | CONTRACTION PERIOD TS |
| TIME (s) | | | $0 \leq t < 0.0431$ | $0.0431 \leq t \leq 0.0531$ | $0 \leq t < 0.0429$ | $0.0429 \leq t \leq 0.0529$ |
| DRIVING FREQUENCY $f_d$ (Hz) | | | 1439.26 | | 1445.00 | |
| FIRST DRIVING SIGNAL | AMPLITUDE (v) | $m_{2a}$ | 679 | 18290 | 611 | 1942 |
| | | $m_{1a}$ | 102 | -1962 | 52 | 25 |
| | | $m_{0a}$ | 5.3 | 60.4 | 4.1 | 0.69 |
| | PHASE (deg) | $n_{2a}$ | 3006 | -8604 | -419 | 183576 |
| | | $n_{1a}$ | -330 | -2657 | -280 | -20116 |
| | | $n_{0a}$ | 44 | 106 | 81 | 466 |
| SECOND DRIVING SIGNAL | AMPLITUDE (v) | $m_{2b}$ | 437 | -7767 | 180 | 12715 |
| | | $m_{1b}$ | 103 | 1255 | 183 | -1292 |
| | | $m_{0b}$ | 7.8 | -31 | 10.4 | 48 |
| | PHASE (deg) | $n_{2b}$ | -596 | 10432 | -2851 | 2857 |
| | | $n_{1b}$ | -29 | -909 | 199 | 2677 |
| | | $n_{0b}$ | 94 | -74 | 133 | -269 |

| DRIVING FREQUENCY $f_d$ (Hz) | MAXIMUM VALUE OF AMPLITUDE $A_1(t)$ | MAXIMUM VALUE OF AMPLITUDE $A_2(t)$ | POWER CONSUMPTION (mW) | CHANGE AMOUNT OF POWER CONSUMPTION (mW/Hz) |
|---|---|---|---|---|
| 1433.80 | 16.00 | 17.50 | 23.4 | -3.1 |
| 1435.50 | 14.25 | 15.00 | 18.2 | -1.9 |
| 1437.40 | 12.75 | 13.50 | 14.6 | -1.4 |
| 1439.26 | 11.00 | 13.50 | 11.9 | -0.7 |
| 1441.10 | 9.50 | 14.50 | 10.6 | 0.0 |
| 1443.00 | 8.25 | 16.50 | 10.5 | 0.6 |
| 1444.90 | 7.50 | 19.00 | 11.7 | 1.3 |
| 1446.70 | 7.00 | 22.00 | 14.0 | 2.0 |
| 1448.50 | 7.50 | 25.00 | 17.7 | 2.3 |
| 1450.30 | 8.50 | 27.50 | 22.0 | 3.0 |

| | |
|---|---|
| $f_{r1}$ | 1448.2 Hz |
| $f_{r2}$ | 1441.0 Hz |
| $Q_1$ | 160 |
| $Q_2$ | 180 |
| $f_{r1} + \Delta f_{r1}$ | 1449.71 Hz |
| $f_{r2} - \Delta f_{r2}$ | 1434.33 Hz |

FIG. 17

| DRIVING FREQUENCY $f_d$ (Hz) | MAXIMUM VALUE OF AMPLITUDE $A_1(t)$ | MAXIMUM VALUE OF AMPLITUDE $A_2(t)$ | POWER CONSUMPTION (mW) | CHANGE AMOUNT OF POWER CONSUMPTION (mW/Hz) |
|---|---|---|---|---|
| 1435.80 | 19.00 | 13.50 | 28.7 | -3.1 |
| 1437.40 | 17.50 | 11.50 | 23.7 | -1.1 |
| 1439.26 | 16.75 | 10.75 | 21.6 | -1.7 |
| 1441.13 | 15.25 | 10.75 | 18.5 | -1.2 |
| 1443.00 | 14.00 | 11.00 | 16.3 | -1.5 |
| 1444.88 | 12.50 | 10.75 | 13.5 | -1.3 |
| 1446.76 | 11.00 | 10.5 | 11.1 | -0.7 |
| 1448.65 | 9.65 | 11.25 | 9.8 | -0.1 |
| 1450.50 | 8.40 | 13.00 | 9.5 | 0.2 |
| 1452.50 | 7.10 | 15.00 | 9.8 | 0.7 |
| 1454.30 | 6.50 | 17.00 | 11.2 | 1.2 |
| 1456.20 | 6.60 | 19.00 | 13.4 | 1.4 |
| 1458.20 | 7.00 | 21.00 | 16.1 | 1.0 |
| 1460.20 | 7.00 | 22.50 | 18.0 | 1.8 |
| 1462.00 | 7.50 | 24.50 | 21.3 | 2.5 |

| $f_{r1}$ | 1459.0 Hz |
| $f_{r2}$ | 1446.5 Hz |
| $Q_1$ | 150 |
| $Q_2$ | 220 |
| $f_{r1} + \Delta f_{r1}$ | 1460.62 Hz |
| $f_{r2} - \Delta f_{r2}$ | 1441.02 Hz |

OPTICAL SCANNING DEVICE AND CONTROL METHOD THEREOF

CROSS-REFERENCE TO RELATED APPLICATIONS

The present application claims priority under 35 U.S.C. § 119 to Japanese Patent Application No. 2022-002608 filed on Jan. 11, 2022. The above application is hereby expressly incorporated by reference, in its entirety, into the present application.

BACKGROUND

1. Technical Field

The technique of the present disclosure relates to an optical scanning device and a control method thereof.

2. Description of the Related Art

In a field of light detection and ranging (LiDAR), an omnidirectional type that can obtain a 360° field of view is drawing attention. Some omnidirectional LiDAR devices are configured by combining a micro electro mechanical systems (MEMS) mirror and an omnidirectional lens. The LiDAR device using the MEMS mirror is lightweight and can be reduced in cost.

In the omnidirectional LiDAR device, the MEMS mirror needs to scan all over a donut-shaped incident surface of the omnidirectional lens with a light beam. In order to scan the above range more efficiently, the MEMS mirror desirably performs a spiral scan such that a radius vector of the light beam changes linearly over time. For this purpose, a spiral rotation operation is required in which a swing angle amplitude (hereinafter referred to as swing amplitude) of a mirror portion changes at a constant change speed. Further, in a case where such a LiDAR device is mounted on a moving body and the like, scanning of a wider range at a high frame rate is important. For this purpose, a change speed of the swing amplitude of the mirror portion is required to be increased.

JP2008-170500A describes a technique related to the spiral rotation operation of the MEMS mirror. JP2008-170500A discloses an optical scanning device comprising a swing plate, a first swing unit that causes, to the swing plate, a first swing around a first axis parallel to a plane including the swing plate, and a second swing unit that causes, to the swing plate, a second swing around a second axis that is parallel to the plane including the swing plate and perpendicular to the first axis at a frequency identical to that of the first swing and at a phase different from that of the first swing by approximately 90°. Further, JP2008-170500A discloses that a scanning position of light reflected by the swing plate is moved to draw a swirl (that is, the spiral rotation operation is performed) with increase or decrease in amplitudes of both the first swing and the second swing with time.

SUMMARY

In JP2008-170500A, with the MEMS mirror having a structure with high symmetry, the MEMS mirror performs the spiral rotation operation. Specifically, in order to form the MEMS mirror having the structure with high symmetry, characteristics (rigidity, mass, attenuation, and the like) of the first axis and the second axis are completely matched and then a driving frequency is substantially matched with a resonance frequency. This is drive control on the premise that the resonance frequency and a resonance Q value are completely matched between the first axis and the second axis. With the use of the resonance phenomenon, it is possible to cause the MEMS mirror to perform the spiral rotation operation with low power consumption.

However, in reality, the resonance frequency often does not match between the first axis and the second axis due to a process error, temperature dependence, changes in characteristics over time, and the like of the MEMS mirror. In particular, in a case where the resonance frequency changes over time, the driving frequency deviates from the resonance frequency. In this case, in order to maintain the spiral rotation operation, it is necessary to significantly increase a driving voltage. As a result, the power consumption required for driving increases. Further, in order to maintain the spiral rotation operation in a wide temperature range, it is necessary to widen a dynamic range of the power consumption of a drive circuit. This causes a problem that the overall power consumption is increased.

An object of the technique of the present disclosure is to provide an optical scanning device and a control method thereof capable of reducing power consumption required for driving and reducing a change in power consumption with a change over time.

In order to achieve the above object, an optical scanning device of the present disclosure is an optical scanning device comprising a mirror device that has a mirror portion, which is swingable around a first axis and a second axis orthogonal to each other, having a reflecting surface reflecting incident light, a first actuator causing the mirror portion to swing around the first axis by applying a rotational torque around the first axis to the mirror portion, and a second actuator causing the mirror portion to swing around the second axis by applying a rotational torque around the second axis to the mirror portion, and a processor that provides a first driving signal to the first actuator and provides a second driving signal to the second actuator. The processor causes the mirror portion to perform a spiral rotation operation with the first driving signal and the second driving signal as cyclic voltage signals. In a case where a resonance frequency and a resonance Q value of a resonance mode, among resonance modes accompanied by mirror tilt swing around the first axis, closest to a frequency of the cyclic voltage signal are respectively set as $f_{r1}$ and $Q_1$, a resonance frequency and a resonance Q value of a resonance mode, among resonance modes accompanied by mirror tilt swing around the second axis, closest to the frequency of the cyclic voltage signal are respectively set as $f_{r2}$ and $Q_2$, and the frequency of the cyclic voltage signal is $f_d$, a relationship of $Q_1 \neq Q_2$, $F_{r2} < f_{r1}$, and $f_{r2} \times (1 - 1/(1.2 \times Q_2)) \leq f_d \leq f_{r1} \times (1 + 1/(6 \times Q_1))$ is satisfied.

It is preferable that the cyclic voltage signal is a signal whose amplitude and phase change over time.

It is preferable that the spiral rotation operation is an operation in which a swing amplitude around the first axis and a swing amplitude around the second axis of the mirror portion change over time in a range from a first value to a second value, respectively.

It is preferable that the second value is larger than the first value, the resonance frequency and the resonance Q value in a case where the swing amplitude around the first axis is the second value are $f_{r1}$ and $Q_1$, and the resonance frequency and the resonance Q value in a case where the swing amplitude around the second axis is the second value are $f_{r2}$ and $Q_2$.

A control method of an optical scanning device of the present disclosure is a control method of an optical scanning device that includes a mirror device that has a mirror portion, which is swingable around a first axis and a second axis orthogonal to each other, having a reflecting surface reflecting incident light, a first actuator causing the mirror portion to swing around the first axis by applying a rotational torque around the first axis to the mirror portion, and a second actuator causing the mirror portion to swing around the second axis by applying a rotational torque around the second axis to the mirror portion. The control method comprises causing the mirror portion to perform a spiral rotation operation with a first driving signal applied to the first actuator and a second driving signal applied to the second actuator as cyclic voltage signals. In a case where a resonance frequency and a resonance Q value of a resonance mode, among resonance modes accompanied by mirror tilt swing around the first axis, closest to a frequency of the cyclic voltage signal are respectively set as $f_{r1}$ and $Q_1$, a resonance frequency and a resonance Q value of a resonance mode, among resonance modes accompanied by mirror tilt swing around the second axis, closest to the frequency of the cyclic voltage signal are respectively set as $f_{r2}$ and $Q_2$, and the frequency of the cyclic voltage signal is $f_d$, a relationship of $Q_1 \neq Q_2$, $F_{r2} < f_{r1}$, and $f_{r2} \times (1-1/(1.2 \times Q_2)) \leq f_d \leq f_{r1} \times (1+1/(6 \times Q_1))$ is satisfied.

According to the technique of the present disclosure, it is possible to provide an optical scanning device and a control method thereof capable of reducing the power consumption required for driving and reducing the change in power consumption with the change over time.

BRIEF DESCRIPTION OF THE DRAWINGS

Exemplary embodiments according to the technique of the present disclosure will be described in detail based on the following figures, wherein:

FIG. 4A shows a first deflection angle and FIG. 4B shows a second deflection angle, FIG. 5A shows a first driving signal and FIG. 5B shows a second driving signal, FIG. 11A shows the spiral orbit during an expansion period and FIG. 11B shows the spiral orbit during a contraction period, FIG. 16A shows the spiral orbit during the expansion period and FIG. 16B shows the spiral orbit during the contraction period, FIG. 17 is a table showing a maximum value of a voltage amplitude, power consumption, and a change amount of the power consumption with respect to the driving frequency.

DETAILED DESCRIPTION

An example of an embodiment according to the technique of the present disclosure will be described with reference to the accompanying drawings.

Figure 1:
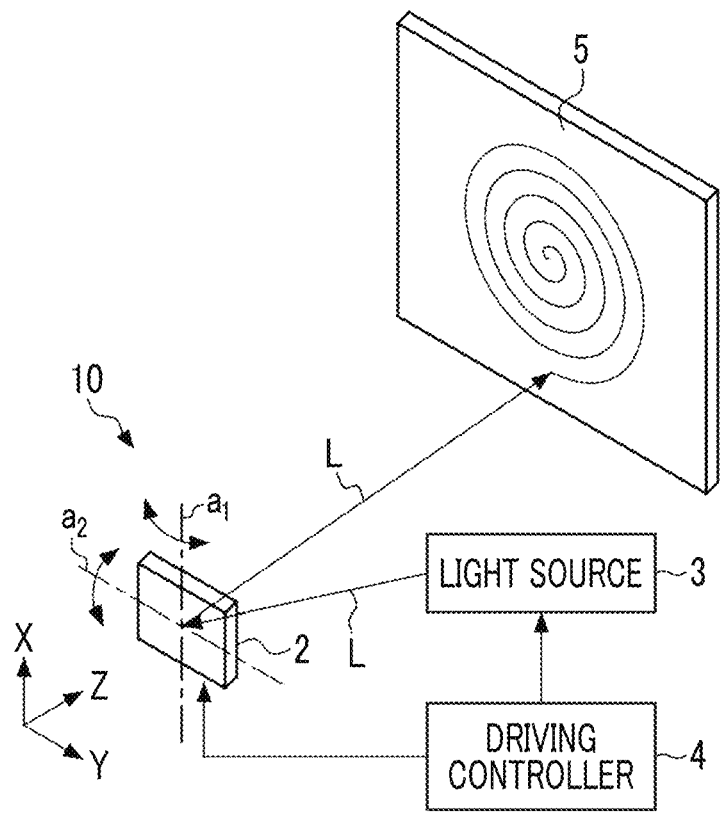
FIG. 1 is a schematic diagram of an optical scanning device.

FIG. 1 schematically shows an optical scanning device 10 according to an embodiment. The optical scanning device 10 has a MEMS mirror 2, a light source 3, and a driving controller 4. In the optical scanning device 10, under control of the driving controller 4, a light beam L emitted from the light source 3 is reflected by the MEMS mirror 2 to perform light scanning on a surface to be scanned 5. The surface to be scanned 5 is, for example, a screen. The MEMS mirror 2 is an example of a "mirror device" according to the technique of the present disclosure.

In a case where the optical scanning device 10 is applied to a LiDAR device, the MEMS mirror 2 is configured in combination with an omnidirectional lens. In this case, the MEMS mirror 2 scans a donut-shaped incident surface of the omnidirectional lens with the light beam L.

The MEMS mirror 2 is a piezoelectric two-axis driving type micromirror device that can swing a mirror portion 20 (refer to FIG. 3) around a first axis $a_1$ and a second axis $a_2$ orthogonal to the first axis $a_1$. Hereinafter, a direction parallel to the first axis $a_1$ is an X direction, a direction parallel to the second axis $a_2$ is a Y direction, and a direction orthogonal to the first axis $a_1$ and the second axis $a_2$ is a Z direction. Further, the swing of the mirror portion 20 is also referred to as a mirror tilt swing.

In the present embodiment, an example in which the first axis $a_1$ and the second axis $a_2$ are orthogonal (that is, intersect perpendicularly) is shown, but the first axis $a_1$ and the second axis $a_2$ may intersect at an angle other than 90°. In the present disclosure, orthogonal means intersecting within a certain angle range including a margin of error centered at 90°.

The light source 3 is, for example, a laser apparatus that emits a laser beam as the light beam L. The light source 3 preferably emits the light beam L perpendicularly to a reflecting surface 20A (refer to FIG. 3) provided in the mirror portion 20 in a state where the mirror portion 20 of the MEMS mirror 2 is stationary.

The driving controller 4 outputs driving signals to the light source 3 and the MEMS mirror 2 based on optical scanning information. The light source 3 generates the light beam L based on the input driving signal and emits the generated light beam to the MEMS mirror 2. The MEMS mirror 2 swings the mirror portion 20 around the first axis $a_1$ and the second axis $a_2$ based on the input driving signal.

As will be described in detail below, the driving controller 4 causes the mirror portion 20 to perform a spiral rotation operation including a period in which a swing amplitude around the first axis $a_1$ and a swing amplitude around the second axis $a_2$ change linearly (that is, spiral rotation operation in which a radius vector changes linearly). With the spiral rotation operation of the mirror portion 20, the reflected light beam L is scanned to draw a spiral orbit (that is, a spiral curve) on the surface to be scanned 5.

Figure 2:
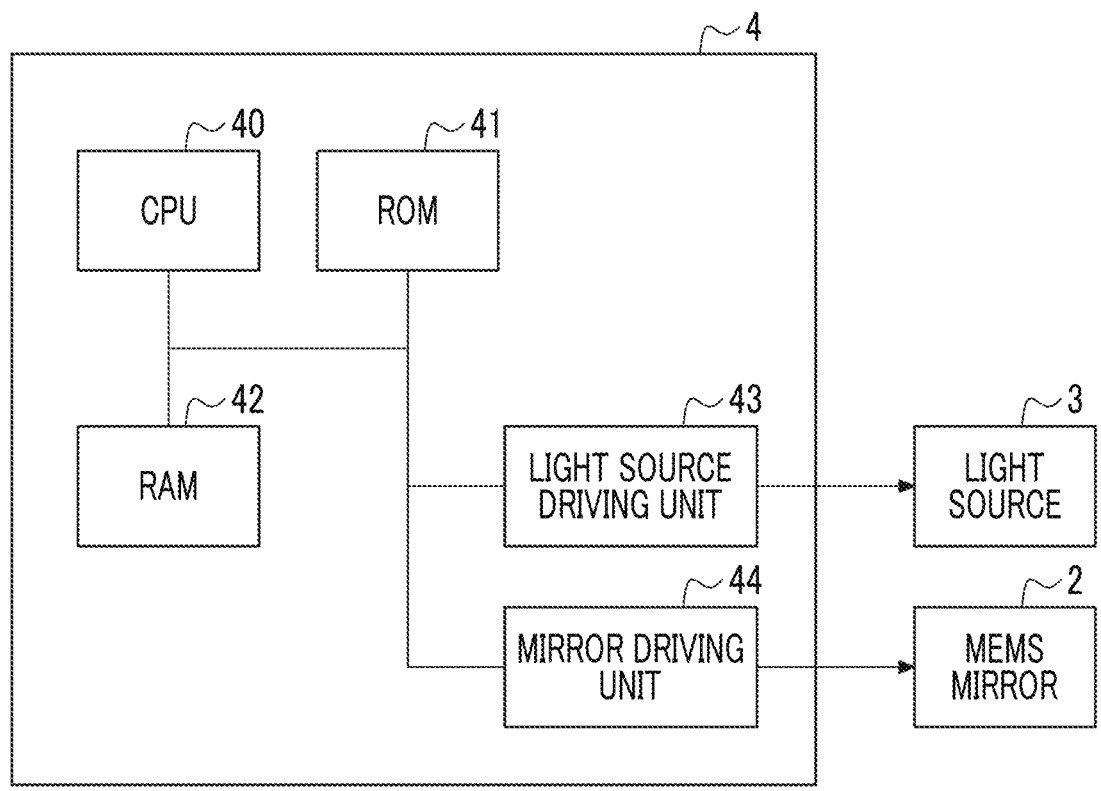
FIG. 2 is a block diagram showing an example of a hardware configuration of a driving controller.

FIG. 2 shows an example of a hardware configuration of the driving controller 4. The driving controller 4 has a central processing unit (CPU) 40, a read only memory (ROM) 41, a random access memory (RAM) 42, a light source driving unit 43, and a mirror driving unit 44. The CPU 40 is a calculation unit that reads out a program and data from a storage device such as the ROM 41 into the RAM 42 and executes processing to realize the entire function of the driving controller 4. The CPU 40 is an example of a "processor" according to the technique of the present disclosure.

The ROM 41 is a non-volatile storage device and stores the program for the CPU 40 to execute the processing and the data such as the above-mentioned optical scanning information. The RAM 42 is a non-volatile storage device that temporarily holds the program and the data.

The light source driving unit 43 is an electric circuit that outputs the driving signal to the light source 3 under the control of the CPU 40. In the light source driving unit 43, the driving signal is a driving voltage for controlling an emission timing and emission intensity of the light source 3.

The mirror driving unit 44 is an electric circuit that outputs the driving signal to the MEMS mirror 2 under the control of the CPU 40. In the mirror driving unit 44, the driving signal is a driving voltage for controlling a timing, cycle, and deflection angle of swinging the mirror portion 20 of the mirror driving unit 44. As will be described in detail below, the driving signal includes a first driving signal and a second driving signal.

For example, in the mirror driving unit 44, the driving signal is created as a digital signal and output via a digital analog converter (DAC) and an amplification amplifier. The driving signal may be output as a stepped waveform based on the number of resolution bits of a digital signal source. Further, the driving signal can be created from a pulse signal, a bandpass filter, and the like.

The CPU 40 controls the light source driving unit 43 and the mirror driving unit 44 based on the optical scanning information. The optical scanning information represents how to scan the surface to be scanned 5 with the light beam L. In the present embodiment, the optical scanning information represents that the light beam L is scanned to draw the spiral orbit on the surface to be scanned 5. For example, in a case where the optical scanning device 10 is applied to the LiDAR device, the optical scanning information includes a timing of emitting the light beam L for distance measurement, an emission range of the light beam, and the like.

Figure 3:
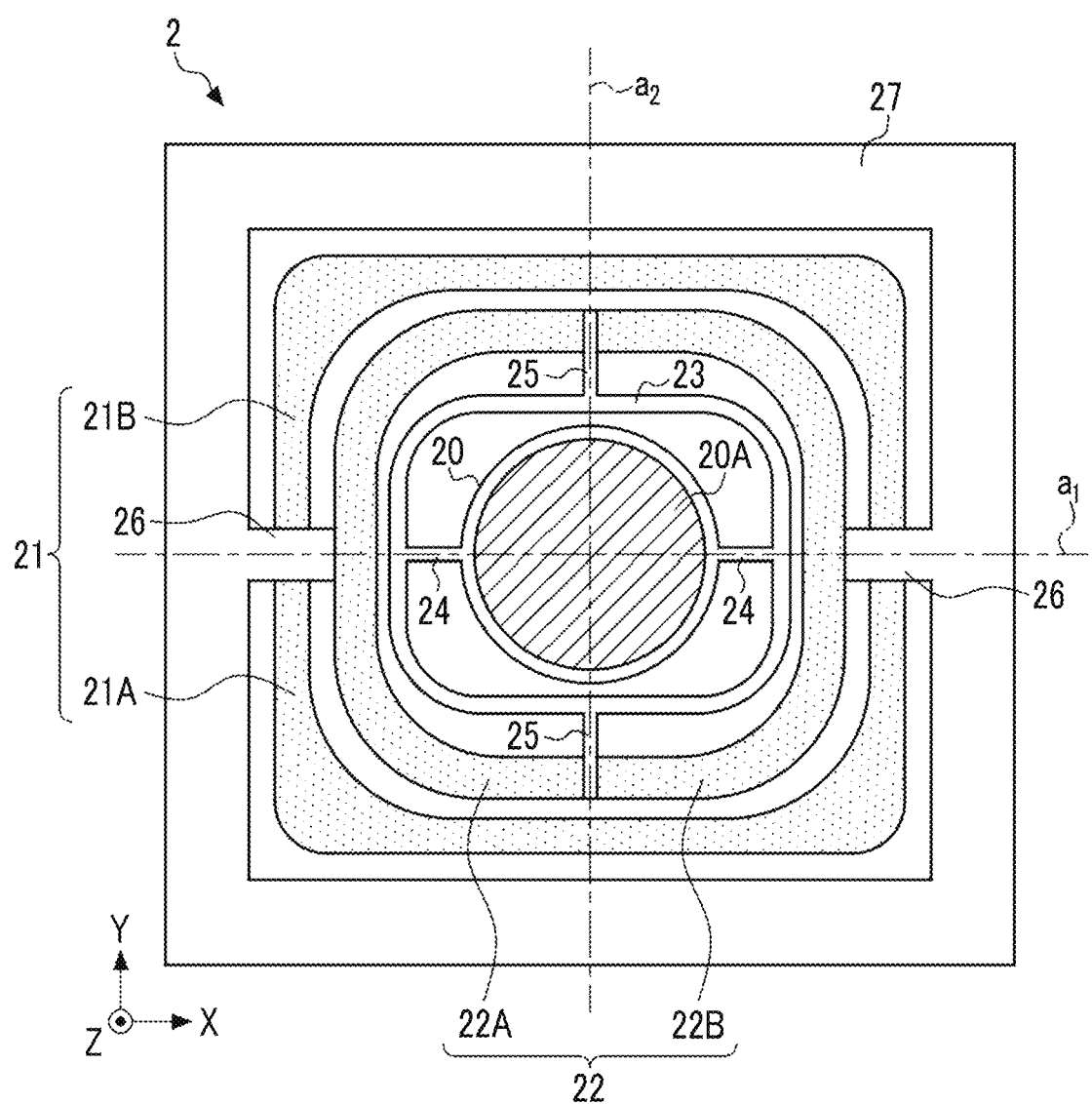
FIG. 3 is a schematic diagram of a micromirror device.

Next, an example of a configuration of the MEMS mirror 2 will be described with reference to FIG. 3. FIG. 3 is a schematic diagram of the MEMS mirror 2.

The MEMS mirror 2 has the mirror portion 20, a first actuator 21, a second actuator 22, a support frame 23, a first support portion 24, a second support portion 25, a connection portion 26, and a fixing portion 27. The MEMS mirror 2 is formed, for example, by etching a silicon-on-insulator (SOI) substrate.

The mirror portion 20 has the reflecting surface 20A reflecting incident light. The reflecting surface 20A is formed of, for example, a metal thin film such as gold (Au) or aluminum (Al) provided on one surface of the mirror portion 20. The reflecting surface 20A is, for example, circular.

The support frame 23 is disposed so as to surround the mirror portion 20. The second actuator 22 is disposed so as to surround the mirror portion 20 and the support frame 23. The first actuator 21 is disposed so as to surround the mirror portion 20, the support frame 23, and the second actuator 22.

The first support portion 24 connects the mirror portion 20 and the support frame 23 on the first axis $a_1$ and supports the mirror portion 20 swingably around the first axis $a_1$. The first axis $a_1$ is in a plane including the reflecting surface 20A in a case where the mirror portion 20 is stationary. For example, the first support portion 24 is a torsion bar extending along the first axis $a_1$.

The second support portion 25 connects the support frame 23 and the second actuator 22 on the second axis $a_2$ and supports the mirror portion 20 and the support frame 23 swingably around the second axis $a_2$. The second axis $a_2$ is orthogonal to the first axis $a_1$ in the plane including the reflecting surface 20A in a case where the mirror portion 20 is stationary.

The connection portion 26 connects the first actuator 21 and the second actuator 22 on the first axis $a_1$. Further, the connection portion 26 connects the first actuator 21 and the fixing portion 27 on the first axis $a_1$.

The fixing portion 27 has a rectangular outer shape and surrounds the first actuator 21. Lengths of the fixing portion 27 in the X direction and the Y direction are each, for example, about 1 mm to 10 mm. A thickness of the fixing portion 27 in the Z direction is, for example, about 5 µm to 0.2 mm.

The first actuator 21 and the second actuator 22 are piezoelectric actuators each provided with a piezoelectric element. The first actuator 21 applies a rotational torque around the first axis $a_1$ to the mirror portion 20. The second actuator 22 applies a rotational torque around the second axis $a_2$ to the mirror portion 20. Accordingly, the mirror portion 20 swings around the first axis $a_1$ and around the second axis $a_2$.

The first actuator 21 is an annular thin plate member that surrounds the mirror portion 20, the support frame 23, and the second actuator 22 in an XY plane. The first actuator 21 is configured of a pair of a first movable portion 21A and a second movable portion 21B. The first movable portion 21A and the second movable portion 21B are each semi-annular. The first movable portion 21A and the second movable portion 21B have a shape that is axisymmetric with respect to the first axis $a_1$ and are connected on the first axis $a_1$.

The support frame 23 is an annular thin plate member that surrounds the mirror portion 20 in the XY plane.

The second actuator 22 is an annular thin plate member that surrounds the mirror portion 20 and the support frame 23 in the XY plane. The second actuator 22 is configured of a pair of a first movable portion 22A and a second movable portion 22B. The first movable portion 22A and the second movable portion 22B are each semi-annular. The first movable portion 22A and the second movable portion 22B have a shape that is axisymmetric with respect to the second axis $a_2$ and are connected on the second axis $a_2$.

In the first actuator 21, the first movable portion 21A and the second movable portion 21B are each provided with piezoelectric elements. In the second actuator 22, the first movable portion 22A and the second movable portion 22B are each provided with piezoelectric elements.

In the present example, the first actuator 21 and the second actuator 22 are each configured as separate annular structures, but the present disclosure is not limited thereto. The first actuator 21 and the second actuator 22 may be configured to coexist in one structure. For example, piezoelectric bodies are disposed into one annular structure in a divided manner. The first driving signal and the second driving signal are provided to two piezoelectric parts separated by the division in this manner, and thus the mirror swings around the first axis $a_1$ and around the second axis $a_2$ can be realized.

Figure 4A:
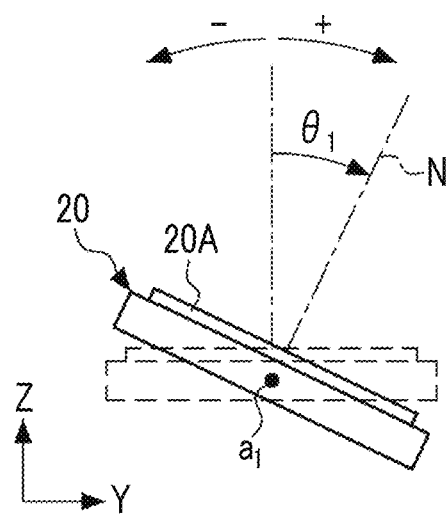
FIGS. 4A and 4B are diagrams for describing deflection angles in a case where a mirror portion swings, where
Figure 4B:
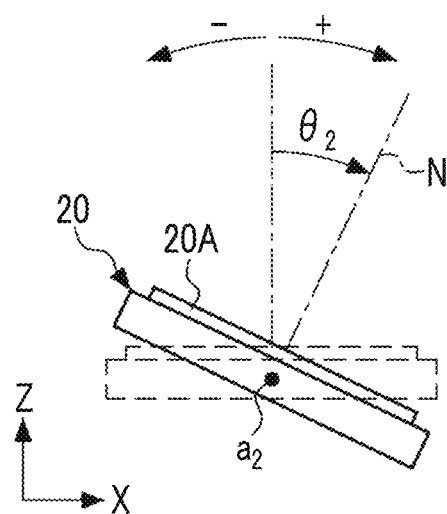

FIGS. 4A and 4B describe deflection angles in a case where the mirror portion 20 swings. FIG. 4A shows a deflection angle (hereinafter referred to as a first deflection angle) $\theta_1$ around the first axis $a_1$ of the mirror portion 20. FIG. 4B shows a deflection angle (hereinafter referred to as a second deflection angle) $\theta_2$ around the second axis $a_2$ of the mirror portion 20.

As shown in FIG. 4A, the first deflection angle $\theta_1$ is an angle at which a normal line N of the reflecting surface 20A of the mirror portion 20 is inclined in a YZ plane. The first deflection angle $\theta_1$ takes a positive value in a case where the normal line N of the reflecting surface 20A is inclined in a +Y direction, and the first deflection angle $\theta_1$ takes a negative value in a case where the normal line N thereof is inclined in a −Y direction.

The first deflection angle $\theta 1$ is controlled by a driving signal (hereinafter referred to as a first driving signal) provided to the first actuator 21 by the driving controller 4. The first driving signal is, for example, a sinusoidal alternating voltage. The first driving signal includes a driving voltage waveform $V_{1A}(t)$ applied to the first movable portion 21A and a driving voltage waveform $V_{1B}(t)$ applied to the second movable portion 21B. The driving voltage waveform $V_{1A}(t)$ and the driving voltage waveform $V_{1B}(t)$ are out of phase with each other (that is, phase difference is 180°).

As shown in FIG. 4B, the second deflection angle $\theta_2$ is an angle at which the normal line N of the reflecting surface 20A of the mirror portion 20 is inclined in an XZ plane. The second deflection angle $\theta_2$ takes a positive value in a case where the normal line N of the reflecting surface 20A is inclined in a +X direction, and the second deflection angle $\theta_2$ takes a negative value in a case where the normal line N thereof is inclined in a −X direction.

The second deflection angle $\theta_2$ is controlled by a driving signal (hereinafter referred to as a second driving signal) provided to the second actuator 22 by the driving controller 4. The second driving signal is, for example, a sinusoidal alternating voltage. The second driving signal includes a driving voltage waveform $V_{2A}(t)$ applied to the first movable portion 22A and a driving voltage waveform $V_{2B}(t)$ applied to the second movable portion 22B. The driving voltage waveform $V_{2A}(t)$ and the driving voltage waveform $V_{2B}(t)$ are out of phase with each other (that is, phase difference is 180°).

Figure 5A:
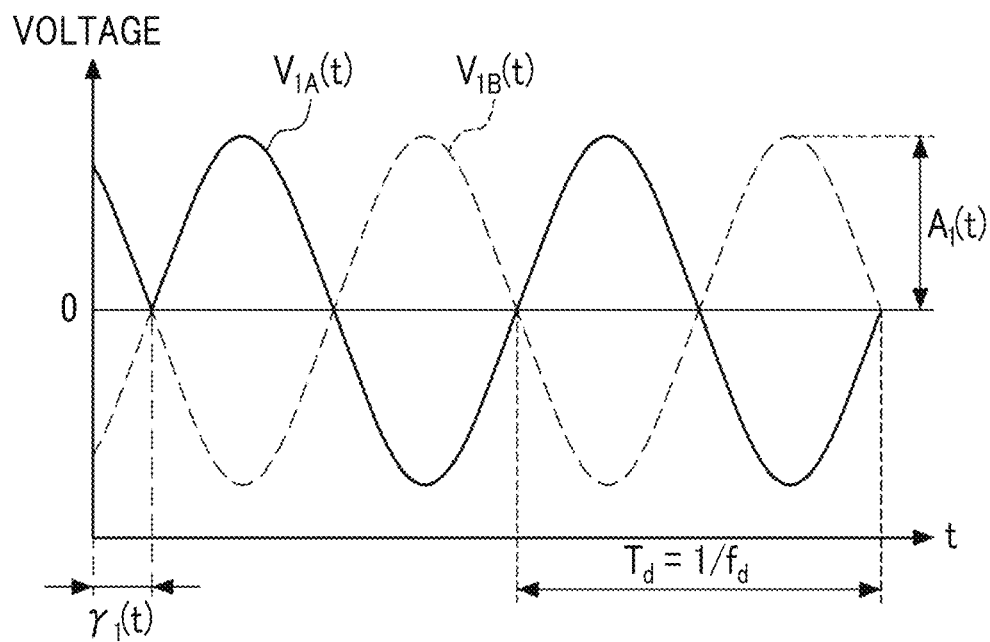
FIGS. 5A and 5B are diagrams showing examples of driving signals applied to a first actuator and a second actuator, where
Figure 5B:
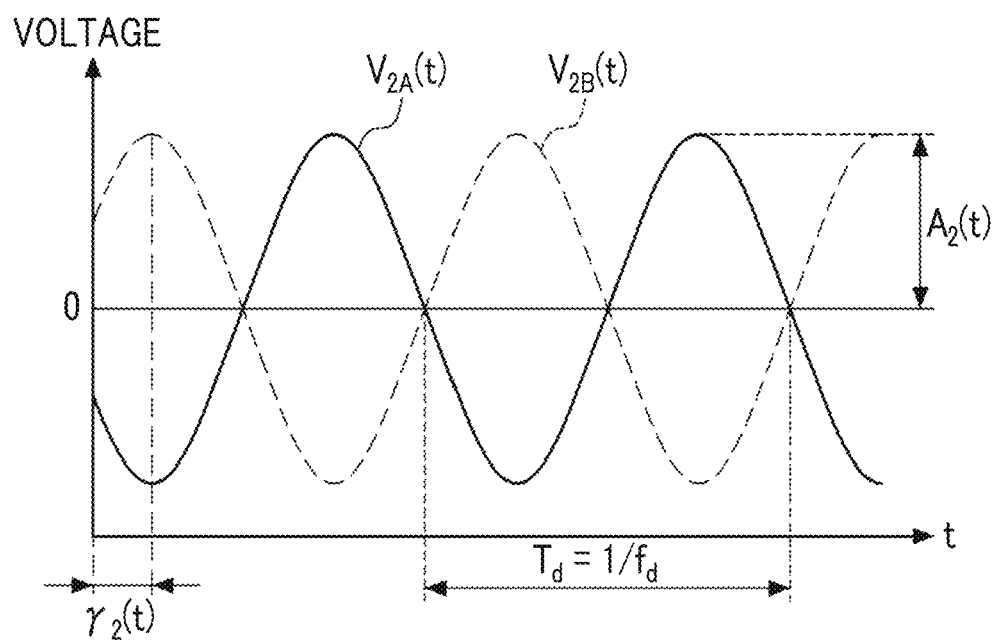

FIGS. 5A and 5B show examples of the driving signals provided to the first actuator 21 and the second actuator 22. FIG. 5A shows the driving voltage waveforms $V_{1A}(t)$ and $V_{1B}(t)$ included in the first driving signal. FIG. 5B shows the driving voltage waveforms $V_{2A}(t)$ and $V_{2B}(t)$ included in the second driving signal.

The driving voltage waveforms $V_{1A}(t)$ and $V_{1B}(t)$ are each represented by the following equations (1A) and (1B).

[Formula 1]

$$V_{1A}(t) = A_1(t)\sin(2\pi f_d t + \gamma_1(t)) \quad (1A)$$

[Formula 2]

$$V_{1B}(t) = A_1(t)\sin(2\pi f_d t + \gamma_1(t) + \pi) \quad (1B)$$

Here, t is a time. $f_d$ is a driving frequency. $A_1(t)$ is amplitude and changes over time t. $\gamma_1(t)$ is phase and changes over time t. The phase difference between the driving voltage waveform $V_{1A}(t)$ and the driving voltage waveform $V_{1B}(t)$ is $\pi$ (that is, 180°).

That is, the first driving signal is a cyclic voltage signal whose amplitude and phase change over time. The driving voltage waveforms $V_{1A}(t)$ and $V_{1B}(t)$ are each applied to the first movable portion 21A and the second movable portion 21B to swing the mirror portion 20 around the first axis $a_1$ in a cycle $T_d(=1/f_d)$.

The driving voltage waveforms $V_{2A}(t)$ and $V_{2B}(t)$ are each represented by the following equations (2A) and (2B).

[Formula 3]

$$V_{2A}(t) = A_2(t)\sin(2\pi f_d t + \gamma_2(t) + \varphi) \quad (2A)$$

[Formula 4]

$$V_{2B}(t) = A_2(t)\sin(2\pi f_d t + \gamma_2(t) + \varphi + \pi) \quad (2A)$$

Here, t is a time. $f_d$ is a driving frequency. $A_2(t)$ is amplitude and changes over time t. $\gamma_2(t)$ is phase and changes over time t. The phase difference between the driving voltage waveform $V_{2A}(t)$ and the driving voltage waveform $V_{2B}(t)$ is $\pi$ (that is, 180°). Further, $\varphi$ is the phase difference between the driving voltage waveforms $V_{1A}(t)$ and $V_{1B}(t)$ and the driving voltage waveforms $V_{2A}(t)$ and $V_{2B}(t)$. In the present embodiment, $\varphi=\pi/2$ (that is, 90°) in order to cause the mirror portion 20 to perform a circular spiral scan operation. A value of $\varphi$ may be set to a value other than $\pi/2$. In a case where $\varphi$ is the value other than $\pi/2$, the mirror portion 20 performs an elliptical spiral scan operation.

That is, the second driving signal is the cyclic voltage signal whose amplitude and phase change over time. The driving voltage waveforms $V_{2A}(t)$ and $V_{2B}(t)$ are each applied to the first movable portion 22A and the second movable portion 22B to swing the mirror portion 20 around the second axis $a_2$ in the cycle $T_d$ $(=1/f_d)$.

The amplitude $A_1(t)$ and phase $\gamma_1(t)$ of the first driving signal are each represented by polynomials indicated by the following equations (3) and (4). The amplitude $A_2(t)$ and phase $\gamma_2(t)$ of the second driving signal are each represented by polynomials indicated by the following equations (5) and (6). In the present embodiment, the polynomial is a secondary function, but may be a cubic or more function. A degree of the polynomial is determined by a required accuracy of the spiral scan operation and calculation power of the processor. $m_{kp}$ and $n_{kp}$ are coefficients. Here, k is 0, 1, or 2. p is a or b. In the present embodiment, the phase $\gamma_2(t)$ is represented by a polynomial including the phase difference $\varphi$.

[Formula 5]

$$A_1(t)=m_{2a}t^2+m_{1a}t+m_{0a} \quad (3)$$

[Formula 6]

$$\gamma_1(t)=n_{2a}t^2+n_{1a}t+n_{0a} \quad (4)$$

[Formula 7]

$$A_2(t)=m_{2b}t^2+m_{1b}t+m_{0b} \quad (5)$$

[Formula 8]

$$\gamma_2(t)+\varphi=n_{2b}t^2+n_{1b}t+n_{0b} \quad (6)$$

The coefficients $m_{kp}$ and $n_{kp}$ are determined such that the swing amplitude around the first axis $a_1$ and the swing amplitude around the second axis $a_2$ of the mirror portion 20 change linearly over time (that is, the radius vector of the spiral orbit changes at a constant change speed). The swing amplitude around the first axis $a_1$ corresponds to a maximum value and a minimum value of the first deflection angle $\theta_1$. The swing amplitude around the second axis $a_2$ corresponds to a maximum value and a minimum value of the second deflection angle $\theta_2$.

For example, the coefficients $m_{kp}$ and $n_{kp}$ are determined by a method in which the driving controller 4 actually inputs the first driving signal and the second driving signal to the MEMS mirror 2 and adjustment is performed while checking the first deflection angle $\theta_1$ and the second deflection angle $\theta_2$ of the mirror portion 20 with a sensor or the like.

As the sensor to detect the deflection angle, there is a method of detecting, with an optical sensor, reflected light of the light beam L, which is emitted from the light source 3 installed outside the MEMS mirror 2 and reflected by the mirror portion 20, a method of incorporating, on the MEMS mirror 2, a strain sensor or the like that generates a voltage according to a stress, and the like.

As described above, the applicant suggests in JP2021-102628 that the coefficients $m_{kp}$ and $n_{kp}$ related to the changes in the amplitude and the phase over time are appropriately determined with the first driving signal and the second driving signal as the cyclic voltage signals whose amplitudes and phases change over time, respectively.

The amplitudes $A_1(t)$ and $A_2(t)$ and the phases $\gamma_1(t)$ and $\gamma_2(t)$ are cyclic functions with a modulation cycle $T_m$ as a unit. In a case where the optical scanning device 10 is applied to the LiDAR device that acquires a distance image, the modulation cycle $T_m$ corresponds to a frame rate of the distance image. In a case where the LiDAR device is mounted on a moving body such as a drone, the modulation cycle $T_m$ is desirably as small as possible. In this case, for example, the frame rate is required to be at least 10 Hz or higher, preferably 20 Hz or higher. That is, the modulation cycle $T_m$ is required to be at least 0.1 seconds or less, preferably 0.05 seconds or less.

A line spacing of the spiral orbit corresponds to a resolution of the distance image. In order to increase the frame rate and narrow the line spacing, scanning at equal spacings without unevenness is most efficient and preferable. In the present embodiment, the spiral rotation operation in which the radius vector changes linearly is realized in order to make line spacings of the spiral orbit equal.

In the present embodiment, the radius vector of the spiral orbit is expanded and contracted in one modulation cycle $T_m$. That is, one modulation cycle $T_m$ includes an expansion period TE and a contraction period TS. The expansion period TE is a period in which the swing amplitude around the first axis $a_1$ and the swing amplitude around the second axis $a_2$ increase linearly. The contraction period TS is a period in which the swing amplitude around the first axis $a_1$ and the swing amplitude around the second axis $a_2$ decrease linearly.

Figure 6:
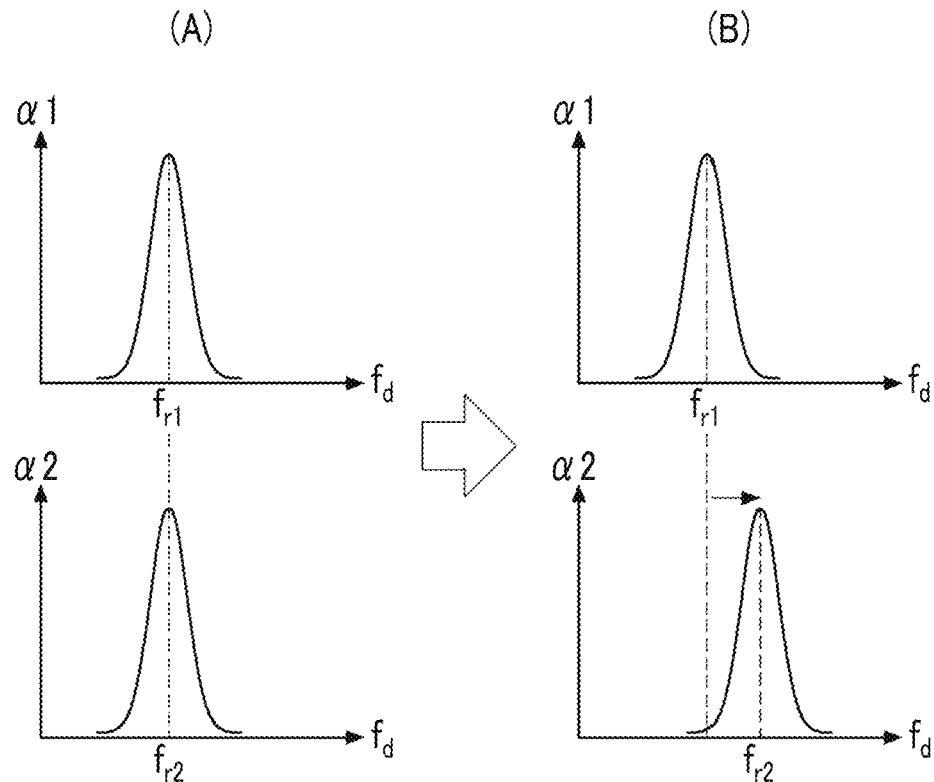
FIG. 6 is a diagram showing a relationship between a first resonance frequency and a second resonance frequency, where (A) of FIG. 6 shows a case where both resonance frequencies are matched and (B) of FIG. 6 shows a case where both resonance frequencies are not matched.

The MEMS mirror 2 has a resonance mode frequency (hereinafter referred to as first resonance frequency $f_{r1}$) accompanied by the swing around the first axis $a_1$ of the mirror portion 20 and a resonance mode frequency (hereinafter referred to as second resonance frequency fa) accompanied by the swing around the second axis $a_2$ of the mirror portion 20. FIG. 6 shows a relationship between the first resonance frequency $f_{r1}$ and the second resonance frequency fa. In FIG. 6, $\alpha 1$ indicates the swing amplitude around the first axis $a_1$, and $a_2$ indicates the swing amplitude around the second axis $a_2$. The first resonance frequency $f_{r1}$ is a driving frequency $f_d$ at which the swing amplitude $\alpha 1$ is maximized in a case where the driving frequency $f_d$ is swept in a state where the mirror portion 20 is caused to swing around the first axis $a_1$. The second resonance frequency $f_{r2}$ is a driving frequency $f_d$ at which the swing amplitude $\alpha 2$ is maximized in a case where the driving frequency $f_d$ is swept in a state where the mirror portion 20 is caused to swing around the second axis $a_2$.

Ideally, as shown in (A) of FIG. 6, the MEMS mirror 2 is designed such that the first resonance frequency $f_{r1}$ substantially match the second resonance frequency $f_{r2}$ and the driving frequency $f_d$ is set to a value that substantially matches the first resonance frequency $f_{r1}$ and the second resonance frequency $f_{r2}$.

However, in reality, as shown in (B) of FIG. 6, the first resonance frequency $f_{r1}$ often does not match the second resonance frequency $f_{r2}$ due to a process error, temperature dependence, changes in characteristics over time, and the like of the MEMS mirror 2. In a case where the first resonance frequency $f_{r1}$ does not match the second resonance frequency $f_{r2}$ in this manner, in order to cause the mirror portion 20 to perform the spiral rotation operation, it is necessary to set the driving frequency $f_d$ to a frequency between the first resonance frequency $f_{r1}$ and the second resonance frequency $f_{r2}$ and to significantly increase the driving frequency $f_d$. As a result, power consumption required for driving increases. Further, in order to maintain the spiral rotation operation in a wide temperature range, it is necessary to widen a dynamic range of the power consumption of a drive circuit. This causes a problem that the overall power consumption is increased.

Figure 7:
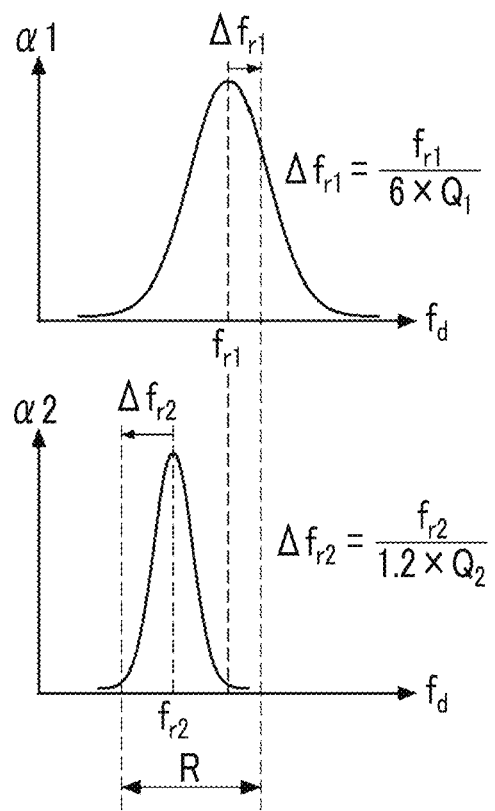
FIG. 7 is a diagram showing power consumption and a frequency range of a driving frequency in which a change in power consumption can be reduced.

Thus, as shown in FIG. 7, the applicant has found that it is possible to reduce the power consumption required for driving and reduce the change in power consumption with the change over time by differentiating a resonance Q value around the first axis $a_1$ of the MEMS mirror 2 (hereinafter referred to as first resonance Q value $Q_1$) from a resonance Q value around the second axis $a_2$ thereof (hereinafter referred to as second resonance Q value $Q_2$) and setting the driving frequency $f_d$ in a frequency range R.

The second resonance frequency $f_{r2}$ is smaller than the first resonance frequency $f_{r1}$, and the frequency range R is a range from $f_{r2}-\Delta f_{r2}$ to $f_{r1}+\Delta f_{r1}$. Further, $\Delta f_{r1}=f_{r1}/(6\times Q_1)$ and $\Delta f_{r2}=f_{r2}/(1.2\times Q_2)$.

In other words, the applicant has found that it is possible to reduce the power consumption and to reduce the change in power consumption with the change over time in a case where $Q_1 \neq Q_2$ and $f_{r2} < f_{r1}$ and the driving frequency $f_d$ satisfies the following equation (7). That is, in the frequency range R, the change in power consumption according to the driving frequency $f_d$ is small and the robustness is high.

[Formula 9]

$$f_{r2} \times \left(1 - \frac{1}{1.2 \times Q_2}\right) \leqq f_d \leqq f_{r1} \times \left(1 + \frac{1}{6 \times Q_1}\right) \qquad (7)$$

The first resonance frequency $f_{r1}$ and the first resonance Q value $Q_1$ are a resonance frequency and a resonance Q value of a basic resonance mode closest to the driving frequency $f_d$ among a plurality of resonance modes accompanied by the mirror tilt swing around the first axis $a_1$. Further, the second resonance frequency $f_{r2}$ and the second resonance Q value $Q_2$ are a resonance frequency and a resonance Q value of a basic resonance mode closest to the driving frequency $f_d$ among a plurality of resonance modes accompanied by the mirror tilt swing around the second axis $a_2$.

The above equation (7) indicates that the preferable frequency range R includes a region between the first resonance frequency $f_{r1}$ and the second resonance frequency $f_{r2}$ (hereinafter referred to as central region) and an outer peripheral region thereof. Further, the above equation (7) indicates that the outer peripheral region is narrow on a high frequency side and wide on a low frequency side. This represents that the robustness on the high frequency side is narrow and the robustness on the low frequency side is wide in the outer peripheral region.

In the central region, there is a relatively broad region with a low power consumption. It is considered that this is because the mirror portion 20 vibrates at the same time in the two resonance modes and thus an interaction such as inertial force is generated and the energy efficiency is improved as compared with a case where each axis is independently driven.

Further, the reason why the robustness spreads to the low frequency side in the outer peripheral region is considered that the resonance frequency is effectively shifted to the low frequency side by the interaction between the two axes of the first axis $a_1$ and the second axis $a_2$. More specifically, the reason why the effective resonance frequency is reduced is considered that a rotating body mass (inertial moment) around the other axis increases as the mirror portion 20 rotates around one of the first axis $a_1$ and the second axis $a_2$. Accordingly, the robustness spreads to the low frequency side.

Further, with the setting of the resonance Q value to be different between the first axis $a_1$ and the second axis $a_2$, the response of the axis having a smaller resonance Q value becomes slow. For example, in a case where the first resonance Q value $Q_1$ is smaller than the second resonance Q value $Q_2$, the response of the first axis $a_1$ becomes slow. Accordingly, there is also an effect that the low power consumption region having the wider range is formed and the change in power consumption with the change over time becomes slow.

The resonance Q value is determined by the balance between kinetic energy and energy dissipation. Therefore, a target resonance Q value can be realized by designing a structure of the MEMS mirror 2 such that these factors are appropriate values. For example, a thick frame structure (also referred to as rib) is provided on a back surface of the mirror portion 20 or the support frame 23 to increase the inertial moment and thus to increase the kinetic energy. Accordingly, the first resonance Q value $Q_1$ and the second resonance Q value $Q_2$ can be increased individually. Further, for example, a comb-tooth structure is provided on an outer periphery of the mirror portion 20 or the support frame 23 to increase the air resistance and thus to increase the energy attenuation. Accordingly, the first resonance Q value $Q_1$ and the second resonance Q value $Q_2$ can be reduced individually.

Hereinafter, Examples will be described. The following Examples 1 and 2 show results of measuring the power consumption in a state where the MEMS mirror 2 is driven and the mirror portion 20 is caused to perform the spiral rotation operation.

Figures 8, 9:
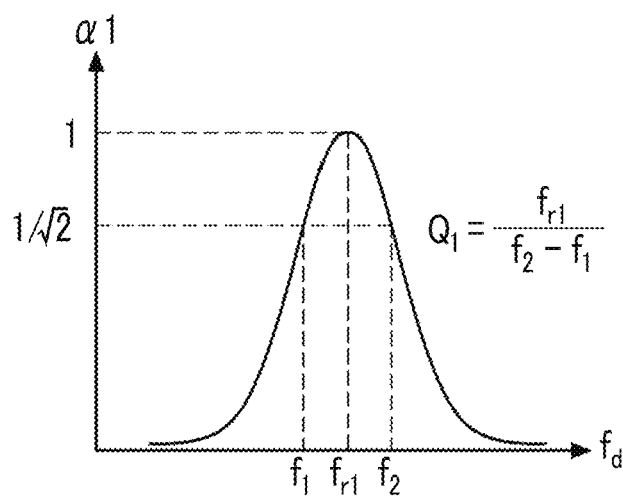
FIG. 8 is a table showing driving conditions used in Examples 1 and 2.
FIG. 9 is a diagram for describing a definition of a first resonance Q value.

FIG. 8 shows driving conditions used in Examples 1 and 2. In Examples 1 and 2, the first driving signal and the second driving signal based on the following driving conditions are provided to the MEMS mirror 2 to cause the mirror portion 20 to perform the spiral rotation operation. In a state where the mirror portion 20 performs the spiral rotation operation, the light beam L is emitted from the light source 3 to the mirror portion 20. The light beam L reflected by the mirror portion 20 is incident on a position sensor diode (PSD) element, and a voltage signal output from the PSD element is converted into an incident position of the light beam L to evaluate the spiral orbit.

The resonance frequency of the MEMS mirror 2 is measured by the following method. A sinusoidal voltage signal is input only to the first actuator 21 to cause the mirror portion 20 to swing around the first axis $a_1$, and a frequency at which the swing amplitude α1 is maximized in a case where a frequency of the sinusoidal wave (that is, driving frequency $f_d$) is changed is set as the first resonance frequency $f_{r1}$. Similarly, a sinusoidal voltage signal is input only to the second actuator 22 to cause the mirror portion 20 to swing around the second axis $a_2$, and a frequency at which the swing amplitude α2 is maximized in a case where a frequency of the sinusoidal wave (that is, driving frequency $f_d$) is changed is set as the second resonance frequency $f_{r2}$.

Further, the spiral rotation operation of the mirror portion 20 is an operation in which the swing amplitude α1 around the first axis $a_1$ and the swing amplitude α2 around the second axis $a_2$ are each changed over time in a range from a first value to a second value (for example, from 5° up to 10°). Here, the second value is larger than the first value. In the present disclosure, the resonance frequency and the resonance Q value in a case where the swing amplitude α1 around the first axis $a_1$ is the second value are defined as the first resonance frequency $f_{r1}$ and the first resonance Q value $Q_1$. Further, the resonance frequency and the resonance Q value in a case where the swing amplitude α2 around the second axis $a_2$ is the second value are defined as the second resonance frequency $f_{r2}$ and the second resonance Q value $Q_2$.

FIG. 9 describes the definition of the first resonance Q value $Q_1$. The first resonance Q value $Q_1$ is defined by the following equation (8).

[Formula 10]

$$Q_1 = \frac{f_{r1}}{f_2 - f_1} \qquad (8)$$

Here, $f_1$ and $f_2$ are the driving frequencies $f_d$ in which the swing amplitude α2 is $2^{-1/2}$ times a maximum value, and there is a relationship of $f_2 > f_1$. The second resonance Q value $Q_2$ is also defined in the same manner.

Example 1

As shown in FIG. 8, in Example 1, the modulation cycle $T_m$ is set to 0.0531 seconds. In the modulation cycle $T_m$, the expansion period TE is set as a period of 0 seconds or more and less than 0.0431 seconds, and the contraction period TS is set as a period of 0.0431 seconds or more and 0.0531 seconds or less. Further, the driving frequency $f_d$ is set to 1439.26 Hz.

In Example 1, the coefficients $m_{kp}$ and $n_{kp}$ are adjusted and determined such that the radius vector of the spiral orbit changes linearly with the amplitude $A_1(t)$ and the phase $\gamma_1(t)$ of the first driving signal each as secondary functions and with the amplitude $A_2(t)$ and the phase $\gamma_2(t)$ of the second driving signal each as secondary functions.

Figure 10:
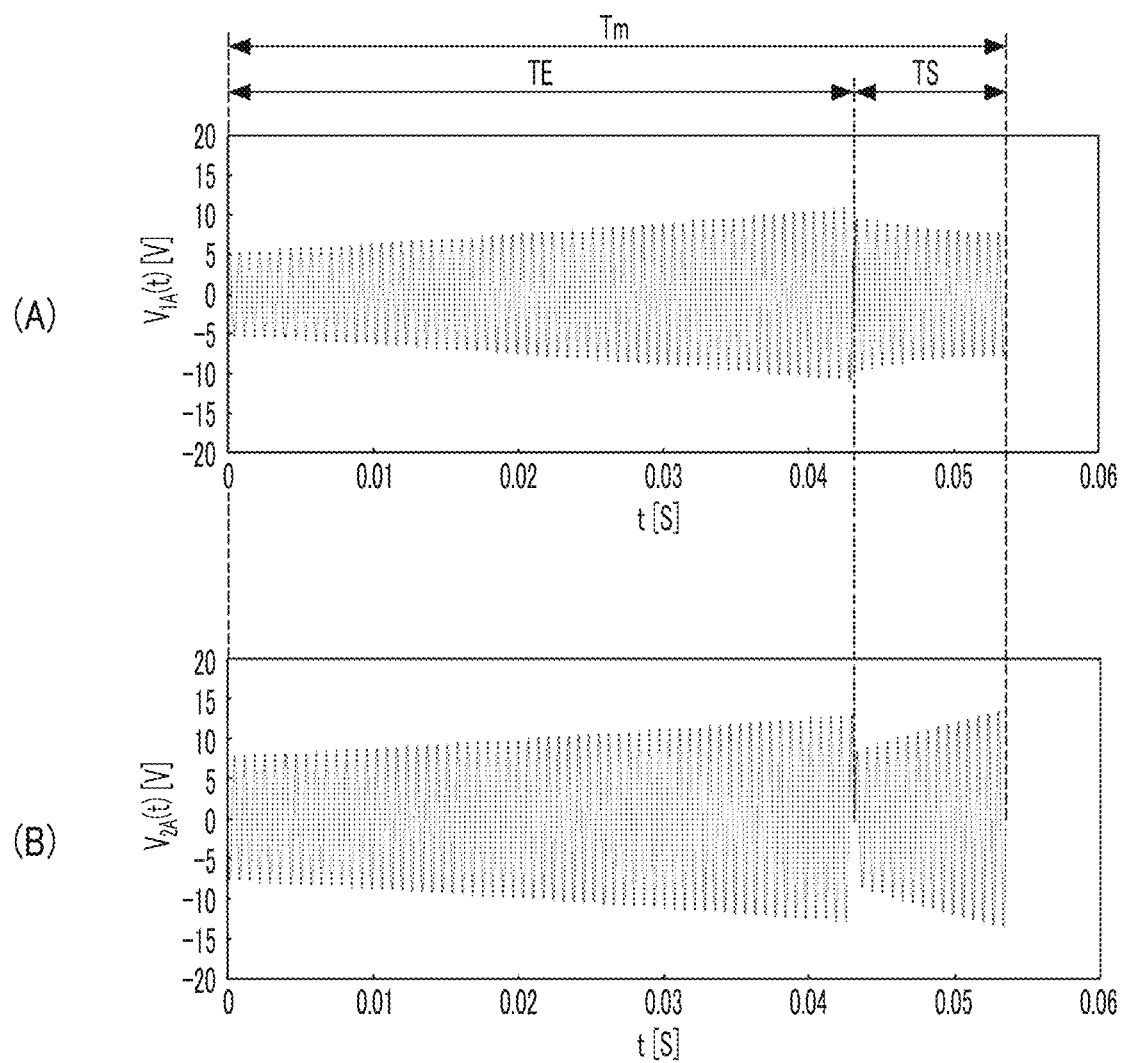
FIG. 10 is a diagram showing changes in driving voltage waveforms over time in one modulation cycle, where (A) of FIG. 10 shows the waveform of the first driving signal and (B) of FIG. 10 shows the waveform of the second driving signal.

FIG. 10 shows changes in the driving voltage waveforms $V_{1A}(t)$ and $V_{2A}(t)$ over time in one modulation cycle $T_m$. The driving voltage waveform $V_{1A}(t)$ shown in (A) of FIG. 10 is obtained by applying the coefficients $m_{kp}$ and $n_{kp}$ shown in FIG. 8 to equation (1A), equation (3), and equation (4). The driving voltage waveform $V_{2A}(t)$ shown in (B) of FIG. 10 is obtained by applying the coefficients $m_{kp}$ and $n_{kp}$ shown in FIG. 8 to equation (1B), equation (5), and equation (6). Since the driving voltage waveforms $V_{1B}(t)$ and $V_{2B}(t)$ are each inverted versions of the driving voltage waveforms $V_{1A}(t)$ and $V_{2A}(t)$, illustrations thereof are omitted.

The first driving signal consisting of the driving voltage waveforms $V_{1A}(t)$ and $V_{1B}(t)$ shown in (A) of FIG. 10 and the second driving signal consisting of the driving voltage waveforms $V_{2A}(t)$ and $V_{2B}(t)$ shown in (B) of FIG. 10 are provided to the MEMS mirror 2. With the above, the first deflection angle $\theta_1$ and second deflection angle $\theta_2$ of the mirror portion 20 that performs the spiral rotation operation are measured. In reality, in order to prevent a polarization reversal of the first actuator 21 and the second actuator 22, which are the piezoelectric actuators, a negative bias of −15 V is added to each of the driving voltage waveforms.

Figure 11A:
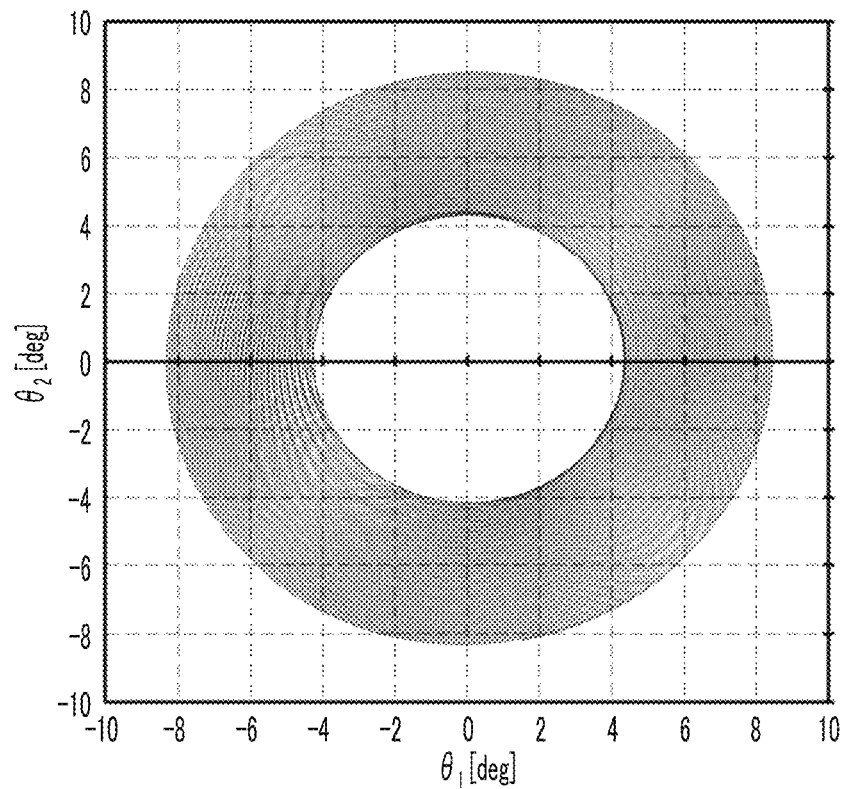
FIGS. 11A and 11B are diagrams showing spiral orbits in one modulation cycle, where
Figure 11B:
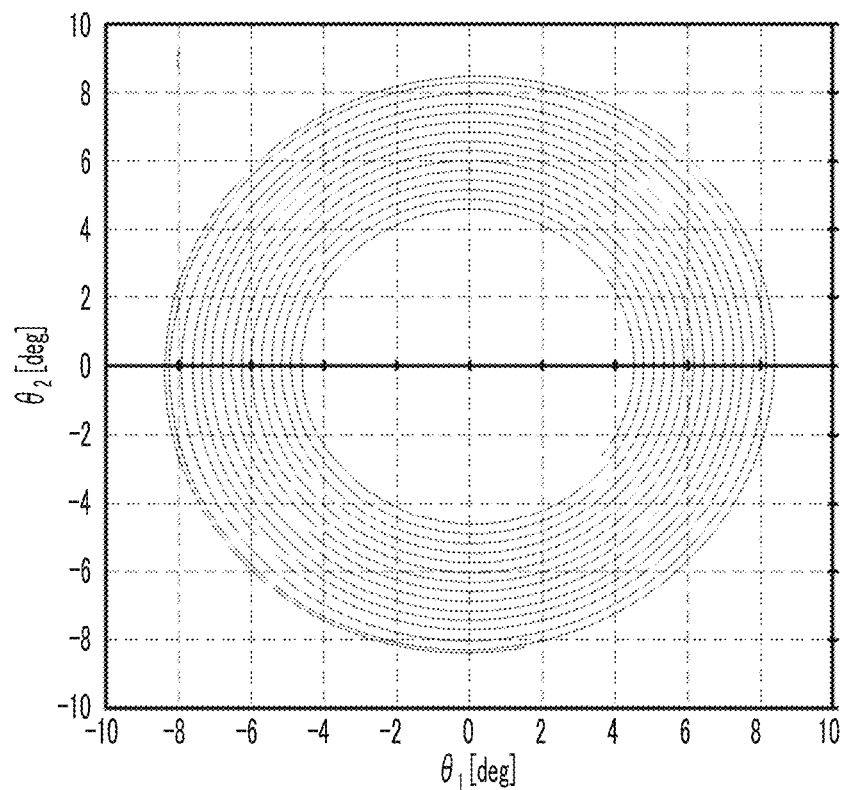

FIGS. 11A and 11B show measurement results of the spiral orbits in one modulation cycle $T_m$. FIG. 11A shows the spiral orbit in the expansion period TE. FIG. 11B shows the spiral orbit in the contraction period TS. As shown in FIGS. 11A and 11B, according to Example 1, the spiral rotation operation in which the radius vector expands and contracts linearly in a range of 4.2° to 8.2° is realized.

Next, the amplitudes $A_1(t)$ and $A_2(t)$ and the phases $\gamma_1(t)$ and $\gamma_2(t)$ are adjusted such that the driving frequency $f_d$ is changed to maintain the spiral orbit in the same angular range as described above. Then, a current value during driving is measured with a current probe, and a product of the current value and the driving voltage is subjected to time integration to calculate an average value of the power consumption in one modulation cycle $T_m$.

Figures 12, 13:
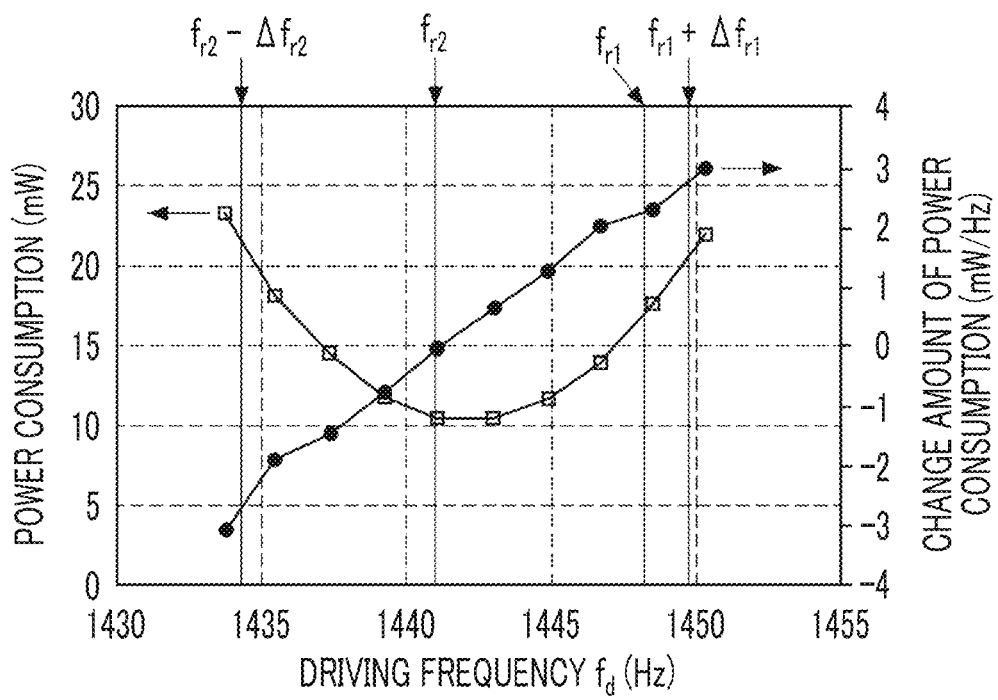
FIG. 12 is a table showing a maximum value of a voltage amplitude, power consumption, and a change amount of the power consumption with respect to the driving frequency.
FIG. 13 is a graph showing dependence of the power consumption and the change amount of the power consumption on the driving frequency.

FIG. 12 shows a maximum value of the amplitude $A_1(t)$, a maximum value of the amplitude $A_2(t)$, the power consumption, and a change amount of the power consumption with respect to the driving frequency $f_d$. The change amount of the power consumption represents a change amount of the power consumption in a case where the driving frequency $f_d$ changes by 1 Hz.

Figures 14, 15:
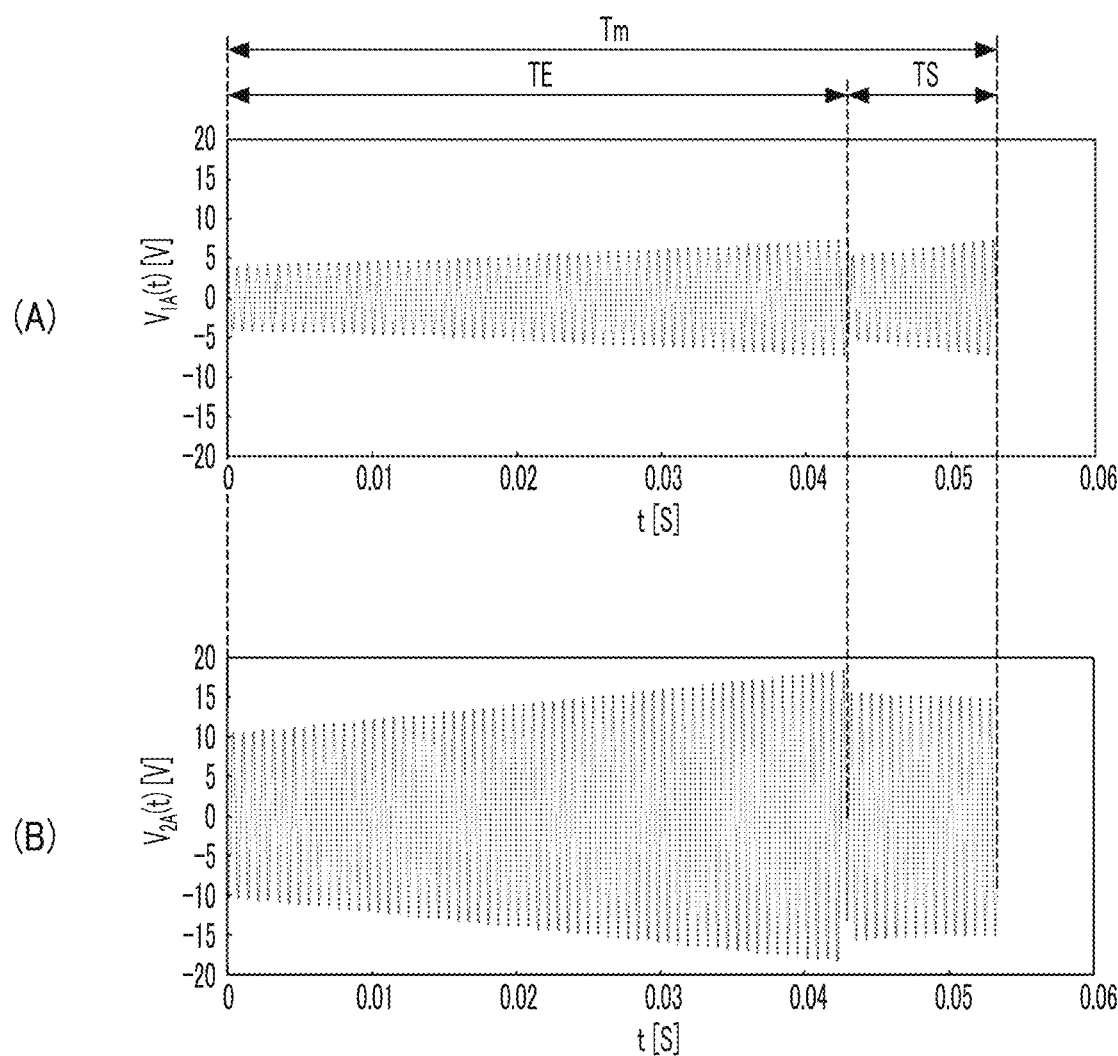
FIG. 14 is a table showing measured values of the first resonance frequency, the second resonance frequency, the first resonance Q value, and a second resonance Q value.
FIG. 15 is a diagram showing changes in driving voltage waveforms over time in one modulation cycle, where (A) of FIG. 15 shows the waveform of the first driving signal and (B) of FIG. 15 shows the waveform of the second driving signal.

FIG. 13 is a graph showing dependence of the power consumption and the change amount of the power consumption on the driving frequency $f_d$. FIG. 14 shows measured values of the first resonance frequency $f_{r1}$, the second resonance frequency $f_{r2}$, the first resonance Q value $Q_1$, and the second resonance Q value $Q_2$. From these measured values, "$f_{r1}+\Delta f_{r1}$" and "$f_{r2}-\Delta f_{r2}$" defining the frequency range R described above are respectively calculated to be 1449.71 Hz and 1434.33 Hz.

As shown in FIG. 13, it can be seen that with the setting of the driving frequency $f_d$ to the frequency range R described above, it is possible to reduce the power consumption required for driving and reduce the change in power consumption with the change over time.

Example 2

Next, Example 2 will be described. As shown in FIG. 8, in Example 2, the modulation cycle $T_m$ is set to 0.0529 seconds. In the modulation cycle $T_m$, the expansion period TE is set as a period of 0 seconds or more and less than 0.0429 seconds, and the contraction period TS is set as a period of 0.0429 seconds or more and 0.0529 seconds or less. Further, the driving frequency $f_d$ is set to 1445.00 Hz.

In Example 2, as in Example 1, the coefficients $m_{kp}$ and $n_{kp}$ are adjusted and determined such that the radius vector of the spiral orbit changes linearly with the amplitude $A_1(t)$ and the phase $\gamma_1(t)$ of the first driving signal each as secondary functions and with the amplitude $A_2(t)$ and the phase $\gamma_2(t)$ of the second driving signal each as secondary functions.

The first driving signal consisting of the driving voltage waveforms $V_{1A}(t)$ and $V_{1B}(t)$ shown in (A) of FIG. 15 and the second driving signal consisting of the driving voltage waveforms $V_{2A}(t)$ and $V_{2B}(t)$ shown in (B) of FIG. 15 are provided to the MEMS mirror 2. With the above, the first deflection angle $\theta_1$ and second deflection angle $\theta_2$ of the mirror portion 20 that performs the spiral rotation operation are measured. In reality, in order to prevent a polarization reversal of the first actuator 21 and the second actuator 22, which are the piezoelectric actuators, a negative bias of −15 V is added to each of the driving voltage waveforms.

Figure 16A:
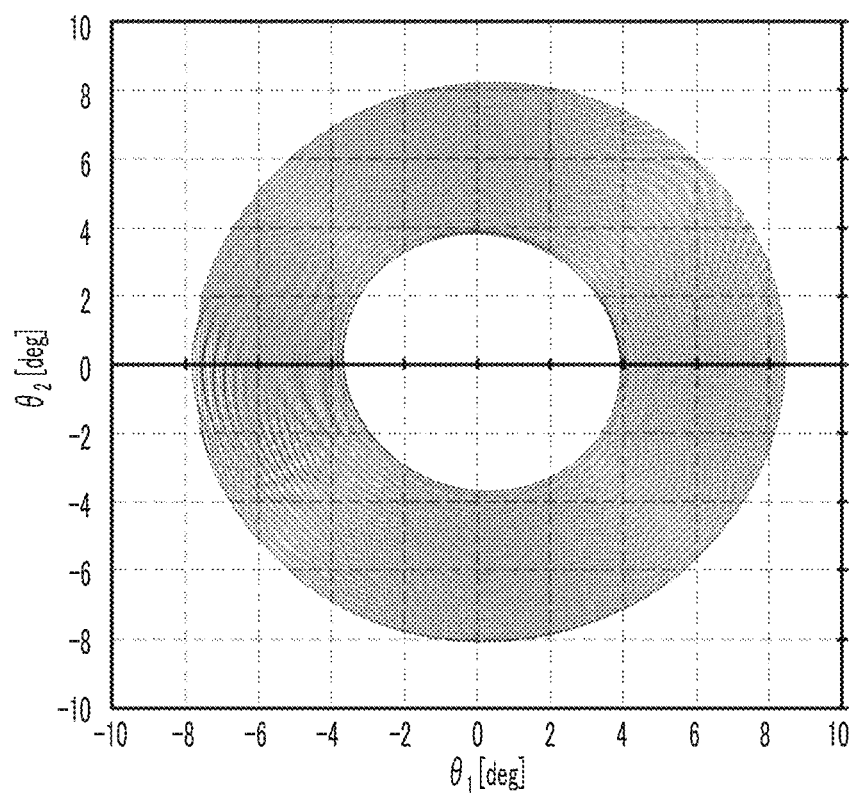
FIGS. 16A and 16B are diagrams showing spiral orbits in one modulation cycle, where
Figure 16B:
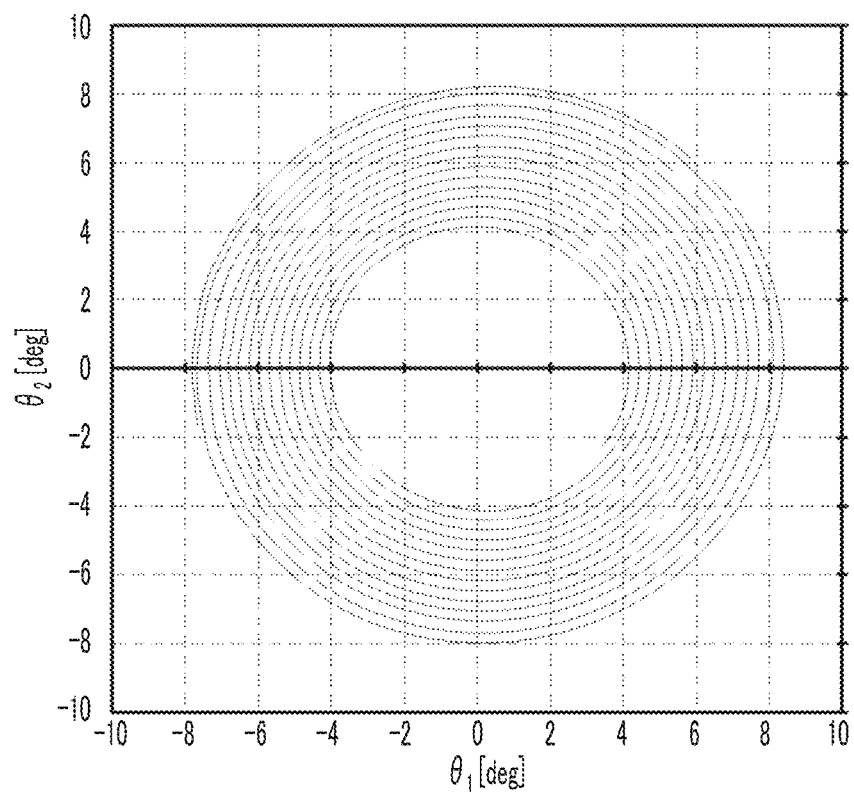

FIGS. 16A and 16B show measurement results of the spiral orbits in one modulation cycle $T_m$. FIG. 16A shows the spiral orbit in the expansion period TE. FIG. 16B shows the spiral orbit in the contraction period TS. As shown in FIGS. 16A and 16B, according to Example 2, the spiral rotation operation in which the radius vector expands and contracts linearly in a range of 3.9° to 8.1° is realized.

Next, the amplitudes $A_1(t)$ and $A_2(t)$ and the phases $\gamma_1(t)$ and $\gamma_2(t)$ are adjusted such that the driving frequency $f_d$ is changed to maintain the spiral orbit in the same angular range as described above. Then, a current value during driving is measured with a current probe, and a product of the current value and the driving voltage is subjected to time integration to calculate an average value of the power consumption in one modulation cycle $T_m$.

FIG. 17 shows a maximum value of the amplitude $A_1(t)$, a maximum value of the amplitude $A_2(t)$, the power consumption, and a change amount of the power consumption with respect to the driving frequency $f_d$. The change amount of the power consumption represents a change amount of the power consumption in a case where the driving frequency $f_d$ changes by 1 Hz.

Figures 18, 19:
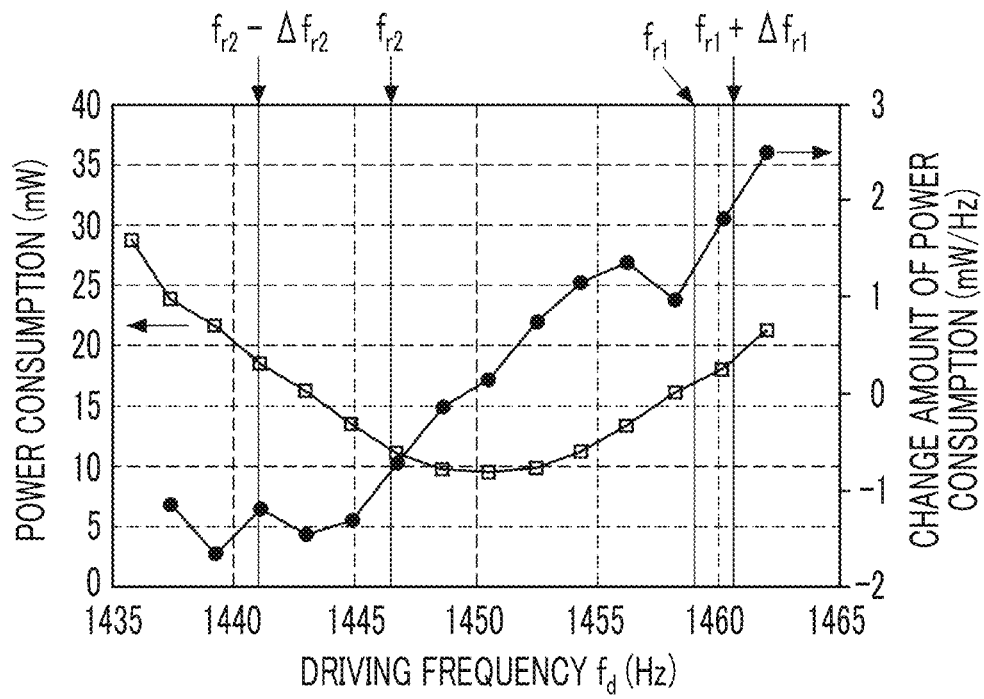
FIG. 18 is a graph showing dependence of the power consumption and the change amount of the power consumption on the driving frequency.
FIG. 19 is a table showing measured values of the first resonance frequency, the second resonance frequency, the first resonance Q value, and the second resonance Q value.

FIG. 18 is a graph showing dependence of the power consumption and the change amount of the power consumption on the driving frequency $f_d$. FIG. 19 shows measured values of the first resonance frequency $f_{r1}$, the second resonance frequency fa, the first resonance Q value $Q_1$, and the second resonance Q value $Q_2$. From these measured values, "$f_{r1}+\Delta f_{r1}$" and "$f_{r2}-\Delta f_{r2}$" defining the frequency range R described above are respectively calculated to be 1460.62 Hz and 1441.02 Hz.

As shown in FIG. 18, it can be seen that with the setting of the driving frequency $f_d$ to the frequency range R described above, it is possible to reduce the power consumption required for driving and reduce the change in power consumption with the change over time.

The first axis $a_1$ and the second axis $a_2$ in the above embodiment are interchangeable. That is, in the above embodiment, the axis along the first support portion 24 is the first axis $a_1$, and the axis along the second support portion 25 is the second axis $a_2$. However, the axis along the first support portion 24 may be the second axis $a_2$, and the axis along the second support portion 25 may be the first axis $a_1$.

The configuration of the MEMS mirror 2 shown in the above embodiment can be changed as appropriate. For example, in the above embodiment, the first actuator 21 and the second actuator 22 have the annular shape, but one or both of the first actuator 21 and the second actuator 22 may have a meander structure. A support member having a configuration other than the torsion bar may be used as the first support portion 24 and the second support portion 25.

The hardware configuration of the driving controller 4 can be modified in various ways. The processing unit of the driving controller 4 may be configured of one processor or a combination of two or more processors of the same type or different types (for example, a combination of a plurality of field programmable gate arrays (FPGAs), and/or a combination of a CPU and an FPGA).

All documents, patent applications, and technical standards described in the present specification are incorporated by reference in the present specification to the same extent as in a case where the incorporation of each individual document, patent application, and technical standard by reference is specifically and individually described.

What is claimed is:

1. An optical scanning device comprising:
   a mirror device that has a mirror portion, which is swingable around a first axis and a second axis orthogonal to each other, having a reflecting surface reflecting incident light, a first actuator causing the mirror portion to swing around the first axis by applying a rotational torque around the first axis to the mirror portion, and a second actuator causing the mirror portion to swing around the second axis by applying a rotational torque around the second axis to the mirror portion; and
   a processor that provides a first driving signal to the first actuator and provides a second driving signal to the second actuator,
   wherein the processor causes the mirror portion to perform a spiral rotation operation with the first driving signal and the second driving signal as cyclic voltage signals, and
   in a case where a resonance frequency and a resonance Q value of a resonance mode, among resonance modes accompanied by mirror tilt swing around the first axis, closest to a frequency of the cyclic voltage signal are respectively set as $f_{r1}$ and $Q_1$, a resonance frequency and a resonance Q value of a resonance mode, among resonance modes accompanied by mirror tilt swing around the second axis, closest to the frequency of the cyclic voltage signal are respectively set as $f_{r2}$ and $Q_2$, and the frequency of the cyclic voltage signal is $f_d$, a relationship of $Q_1 \neq Q_2$, $f_{r2} < f_{r1}$, and $f_{r2} \times (1-1/(1.2 \times Q_2)) \leq f_d \leq f_{r1} \times (1+1/(6 \times Q_1))$ is satisfied.

2. The optical scanning device according to claim 1, wherein the cyclic voltage signal is a signal whose amplitude and phase change over time.

3. The optical scanning device according to claim 2, wherein the spiral rotation operation is an operation in which a swing amplitude around the first axis and a swing amplitude around the second axis of the mirror portion change over time in a range from a first value to a second value, respectively.

4. The optical scanning device according to claim 3, wherein the second value is larger than the first value,
   the resonance frequency and the resonance Q value in a case where the swing amplitude around the first axis is the second value are $f_{r1}$ and $Q_1$, and
   the resonance frequency and the resonance Q value in a case where the swing amplitude around the second axis is the second value are $f_{r2}$ and $Q_2$.

5. A control method of an optical scanning device that includes a mirror device that has a mirror portion, which is swingable around a first axis and a second axis orthogonal to each other, having a reflecting surface reflecting incident light, a first actuator causing the mirror portion to swing around the first axis by applying a rotational torque around the first axis to the mirror portion, and a second actuator causing the mirror portion to swing around the second axis by applying a rotational torque around the second axis to the mirror portion, the control method comprising:
   causing the mirror portion to perform a spiral rotation operation with a first driving signal applied to the first actuator and a second driving signal applied to the second actuator as cyclic voltage signals,
   wherein in a case where a resonance frequency and a resonance Q value of a resonance mode, among resonance modes accompanied by mirror tilt swing around the first axis, closest to a frequency of the cyclic voltage signal are respectively set as $f_{r1}$ and $Q_1$, a resonance frequency and a resonance Q value of a resonance mode, among resonance modes accompanied by mirror tilt swing around the second axis, closest to the frequency of the cyclic voltage signal are respectively set as $f_{r2}$ and $Q_2$, and the frequency of the cyclic voltage signal is $f_d$, a relationship of $Q_1 \neq Q_2$, $f_{r2} < f_{r1}$, and $f_{r2} \times (1-1/(1.2 \times Q_2)) \leq f_d \leq f_{r1} \times (1+1/(6 \times Q_1))$ is satisfied.

* * * * *